United States Patent
Anheier et al.

(10) Patent No.: US 9,353,836 B2
(45) Date of Patent: May 31, 2016

(54) DRIVING DEVICE AND MODULAR SYSTEM FOR SUCH A DRIVING DEVICE

(71) Applicant: Stabilus GmbH, Koblenz (DE)

(72) Inventors: Lars Anheier, Kobern-Gondorf (DE);
Ulrich Probst, Hillscheid (DE); Thomas Muller, Leuterod (DE); Meik Broder, Koblenz (DE)

(73) Assignee: Stabilus GMBH, Koblenz (DE)

( * ) Notice: Subject to any disclaimer, the term of this patent is extended or adjusted under 35 U.S.C. 154(b) by 141 days.

(21) Appl. No.: 13/927,320

(22) Filed: Jun. 26, 2013

(65) Prior Publication Data
US 2014/0000394 A1 Jan. 2, 2014

(30) Foreign Application Priority Data
Jun. 27, 2012 (DE) .......... 10 2012 211 062

(51) Int. Cl.
*F16H 3/06* (2006.01)
*F16H 27/02* (2006.01)
*F16H 29/02* (2006.01)
(Continued)

(52) U.S. Cl.
CPC .............. *F16H 25/20* (2013.01); *E05F 15/622* (2015.01); *F16H 25/2021* (2013.01); *F16H 25/2454* (2013.01); *F16H 57/029* (2013.01); *F16H 57/031* (2013.01); *F16H 57/033* (2013.01); *H02K 7/06* (2013.01); *E05Y 2800/205* (2013.01); *E05Y 2800/242* (2013.01); *E05Y 2800/72* (2013.01); *E05Y 2900/50* (2013.01); *E05Y 2900/546* (2013.01); *F16H 2025/2031* (2013.01); *F16H 2025/2075* (2013.01); *F16H 2057/0335* (2013.01); *Y10T 74/18624* (2015.01)

(58) Field of Classification Search
CPC . Y10T 74/18624; E05F 15/622; F16H 25/20; F16H 2057/0335; F16H 25/2021; F16H 25/2454; F16H 2025/2031; F16H 57/033; F16H 57/029; F16H 2025/2075; F16H 57/031; E05Y 2900/546; E05Y 2800/72; E05Y 2900/50; H02K 7/06
See application file for complete search history.

(56) References Cited

U.S. PATENT DOCUMENTS 2,988,609 A 6/1961 Evans, Jr.
6,142,269 A * 11/2000 Wonn .......................... 188/290
(Continued)

FOREIGN PATENT DOCUMENTS

DE 4201206 8/1993
DE 19501432 7/1996
(Continued)

OTHER PUBLICATIONS

European Search Report dated Nov. 11, 2013.

*Primary Examiner* — William Kelleher
*Assistant Examiner* — Jake Cook
(74) *Attorney, Agent, or Firm* — Rankin, Hill & Clark LLP

(57) ABSTRACT

A modular system of driving devices that each includes a rotary drive assembly and a spindle drive assembly. The modular system includes at least two rotary drive assemblies and at least two spindle drive assemblies which are formed with coupling elements which are compatible with one another. The rotary drive of the driving device is received in a housing tube which is closed at its end remote from the spindle drive by a base piece. The base piece and the housing tube are manufactured from plastics material and are connected to one another by cohesive bonding.

8 Claims, 9 Drawing Sheets

(51) Int. Cl.
  *F16H 29/20* (2006.01)
  *F16H 25/20* (2006.01)
  *F16H 25/24* (2006.01)
  *F16H 57/029* (2012.01)
  *F16H 57/031* (2012.01)
  *F16H 57/033* (2012.01)
  *H02K 7/06* (2006.01)
  *E05F 15/622* (2015.01)

(56) References Cited

U.S. PATENT DOCUMENTS

| | | | | |
|---|---|---|---|---|
| 6,158,295 | A * | 12/2000 | Nielsen | 74/89.38 |
| 2004/0025614 | A1* | 2/2004 | Schlenker | 74/425 |
| 2004/0093969 | A1* | 5/2004 | Nielsen | 74/89.23 |
| 2005/0241436 | A1* | 11/2005 | Leimann | 74/606 R |
| 2007/0062119 | A1* | 3/2007 | Ritter | 49/343 |
| 2008/0196524 | A1* | 8/2008 | Oberle et al. | 74/89.34 |
| 2008/0196965 | A1* | 8/2008 | Oberle et al. | 180/384 |
| 2008/0264201 | A1* | 10/2008 | Bhatti | 74/606 R |
| 2008/0271552 | A1* | 11/2008 | Arenz et al. | 74/89.23 |
| 2008/0295624 | A1* | 12/2008 | Oberle et al. | 74/89.34 |
| 2009/0193917 | A1* | 8/2009 | Jensen et al. | 74/22 R |
| 2009/0199667 | A1* | 8/2009 | Menjak et al. | 74/424.7 |
| 2009/0199668 | A1 | 8/2009 | Batosky | |
| 2009/0200830 | A1 | 8/2009 | Paton | |
| 2009/0256440 | A1* | 10/2009 | Kragh et al. | 310/89 |
| 2010/0282009 | A1* | 11/2010 | Knudsen et al. | 74/89.37 |
| 2011/0072920 | A1* | 3/2011 | Gronli | 74/89.29 |
| 2011/0271779 | A1* | 11/2011 | Corcoran | 74/89.23 |

FOREIGN PATENT DOCUMENTS

| | | |
|---|---|---|
| DE | 102006053730 | 5/2008 |
| DE | 202007002306 | 6/2008 |
| DE | 102007048928 | 4/2009 |
| DE | 102008008743 | 9/2009 |
| DE | 102008025072 | 12/2009 |
| EP | 1186800 | 3/2002 |
| EP | 2196702 | 6/2010 |
| JP | 2005282787 | 10/2005 |

* cited by examiner

DRIVING DEVICE AND MODULAR SYSTEM FOR SUCH A DRIVING DEVICE

The invention relates to a driving device, in particular for a flap of a vehicle, comprising a rotary drive and a spindle drive having a threaded spindle and a threaded nut disposed on the threaded spindle, wherein the rotary drive having the threaded spindle or the threaded nut is connected via a coupling unit to a first coupling element on the rotary drive side and to a second coupling element on the spindle drive side, and wherein the threaded spindle and the threaded nut are axially movable relative to one another in reaction to a rotation of the rotary drive.

Such driving devices are generally known from the prior art. Reference is made merely by way example to DE 10 2008 008 743 A1. The design of the driving device is usually chosen in adaptation to the particular application. This leads to a great variety of different driving devices which have to be kept in store in order to meet every customer requirement. This problem may be explained in a simple manner as follows: If rotary drives are to be provided on the rotary drive side with only three different power stages, i.e. low power, medium power and high power, and are to be provided on the spindle drive side with only three different stroke lengths, i.e. short stroke length, medium stroke length and long stroke length, then a total of nine different types of driving devices have to be kept in stock in order to be able to serve all customers' wishes promptly. This is expensive and thus disadvantageous.

Therefore it is the object of the present invention to modify the driving device of the type mentioned at the outset in such a way as to meet the customer's wish for a large variety of different types of driving devices with reduced costs for storage.

According to a first aspect of the present invention this object is achieved by a driving device of the type mentioned at the outset which is made up of a rotary drive assembly and a spindle drive assembly, wherein the rotary drive assembly comprises the rotary drive and the first coupling element and the spindle drive assembly comprises the spindle drive and the second coupling element, and the rotary drive assembly and the spindle drive assembly are removed from a modular system which comprises as least two rotary drive assemblies and at least two spindle drive assemblies, wherein the at least two rotary drive assemblies of the modular system have identically constructed first coupling elements, but with regard to the configuration of the rotary drive differ from one another in at least one configuration parameter, for example the rotary drive power, wherein the at least two spindle drive assemblies of the modular system have identically constructed second coupling elements, but with regard to the configuration of the spindle drive differ from one another in at least one configuration parameter, for example the stroke length, and wherein the first coupling elements of the at least two rotary drive assemblies and the second coupling elements the at least two spindle drive assemblies are designed to be compatible with one another. Thus according to the invention it is no longer necessary to keep nine different types of driving devices in store, but only six assemblies, i.e. three rotary drive assemblies and three spindle drive assemblies, from which the nine types of driving devices can be put together in a simple manner. It will be easily seen that the effect of the simplified storage according to the invention becomes even more apparent when the variety of configuration parameters of the driving device on both the rotary drive side and the spindle drive side numbers more than three.

A further problem which occurs repeatedly in the generic driving devices is their corrosion resistance, in particular their sealing against the penetration of moisture, for instance when the driving devices are used as an actuating drive for opening and closing doors and flaps, for example tailgates or boot lids, of motor vehicles.

In order to eliminate this problem, according to a second aspect for which independent protection is sought, a driving device of the type mentioned at the outset is proposed, in which the rotary drive is received in a housing tube which is closed at its end remote from the spindle drive by a base piece, and in which the base piece and the housing tube are manufactured from plastics material, and the base piece is connected by cohesive bonding to the housing tube. The penetration of moisture can easily be prevented or at least considerably impeded by the cohesively bonded connection. The manufacture from plastics material also has the advantage that less noise is generated or noise which cannot be prevented is damped.

The cohesively bonded connection can be ensured in a simple manner in that the housing tube and the base piece are formed in one piece. However, it is likewise conceivable that the housing tube and the base piece are formed separately from one another and are cohesively bonded to one another at a later stage.

In an advantageous modification of the second aspect of the present invention, but also independently of the cohesively bonded connection of the base piece and the housing tube according to this second aspect, a polyamide, for example PA6.6, preferably fibre-reinforced PA6.6, can be used as material for the housing tube or/and the base piece. However, it is basically also conceivable to use a different polyamide. Furthermore, polyamide does not need to be used in the pure form. Rather, the use of a compound comprising a polyamide or of a polyamide copolymer is conceivable.

For connection by cohesive bonding at a later stage one of the following processes may be used for example: ultrasonic shaping, laser welding, hot gas welding, adhesive bonding. All these processes can be readily used with the above-mentioned plastics materials.

As is known per se from generic driving devices, the spindle drive of the driving device according to the invention in both aspects according to the invention can be surrounded by a casing tube.

In this case the casing tube can be integrally connected to the housing tube. In connection with the first aspect of the present invention it may be pointed out that in this case the casing tube is associated with the rotary drive assembly from the outset. The adaptation to spindle drive assemblies of different lengths can take place for example in that the casing tube has a length which is fixed with regard to the longest spindle drive assembly, and in combination with a shorter spindle drive assembly it can be cut to length appropriately.

Alternatively, it is also conceivable that the housing tube and the base piece are formed separately from one another and are cohesively bonded to one another at a later stage. In this case the casing tube can be associated with the spindle drive assembly and is not connected to the housing tube by cohesive bonding until the final assembly. The cohesively bonded connection may be produced for example by welding, in particular by laser welding. However, the use of the other connection techniques mentioned above is conceivable. Also in this case the casing tube may be produced from a polyamide, for example PA6.6, preferably fibre-reinforced PA6.6. However, it is basically also conceivable to use a different polyamide. Furthermore, polyamide does not need to be used in the pure form. Rather, the use of a compound comprising a polyamide or of a polyamide copolymer is conceivable.

In a modification of both aspects according to the invention it is proposed that a radially inwardly protruding projection is provided, wherein the rotary drive is held in the housing tube between the base piece and the projection. In the assembled state of the driving device this projection forms with its one axial end face an axial support point for the rotary drive and/or with its other axial end face it forms an axial support point for the spindle drive. In principle a plurality of radially inwardly protruding projections can also be provided, of which one forms an axial support point for the rotary drive whilst another forms an axial support point for the spindle drive.

Moreover, the projection can form a type of interface on which the first coupling element and the second coupling element interact with one another, for example in that the first coupling element is disposed adjacent to the projection on the side thereof facing the rotary drive and the second coupling element or the end of the threaded spindle supporting it passes through an axial passage left by the projection, in order to come into coupling engagement with the first coupling element. In principle, however, the first coupling element could also be the one which passes through the axial passage left by the projection. In the case of at least two radially inwardly protruding projections the two coupling elements can also be in coupling engagement with one another between these projections.

Advantageously the coupling engagement of the first coupling element and of the second coupling element can be formed in the axial direction by a snap connection and in the circumferential direction by connection of the two coupling elements by positive engagement. In this way the coupling engagement of the two coupling elements can be produced in a simple manner, in that they are pushed onto one another in the axial direction until the snap connection closes, producing the connection by positive engagement in the circumferential direction. In this case the snap connection may for example comprise a circlip which is compressed when the second coupling element is introduced into the first coupling element, opens out again when the coupling engagement is produced and secures the two coupling elements on one another by positive engagement. The positive engagement in the circumferential direction can be provided for example in the form of a multi-tooth connection.

According to a first embodiment the projection can be formed integrally with the housing tube. In this case it is necessary for the base piece to be formed separately from the housing tube, so that the rotary drive can be introduced into the housing tube from the side of the housing tube associated with the base piece before the base piece and the housing tube are connected to one another by cohesive bonding. In this first embodiment the casing tube can be both integrally formed with the housing tube and also formed separately therefrom and connected by cohesive bonding.

According to a second embodiment the projection can be formed integrally with the casing tube, wherein this differs from the first embodiment only if the casing tube is formed separately from the housing tube and is connected thereto by cohesive bonding.

According to a third embodiment the projection can be formed separately from the housing tube and the casing tube, but can be connected to them or to one of them in an operationally stable manner. The element forming the projection can be connected to the housing tube or/and the casing tube for example by latching. In this case at least one latching lug provided on the element forming the projection can engage in an associated latching recess of the housing tube or/and of the casing tube.

Alternatively, however, it is also possible for the element forming the projection to be held on the housing tube or/and casing tube by means of a bead on the housing tube or/and on the casing tube or by means of welding to the housing tube or/and to the casing tube. To enable the welding, the element forming the projection can have a core which simplifies the welding.

In order to be able to compensate for play which may result from any manufacturing tolerances, in a modification of both aspects of the invention it is proposed that a disc spring is provided between the base piece and the projection, preferably on the side of the rotary drive adjacent to the projection.

It should also be added that a torque support is associated with the spindle drive and during rotation of the threaded spindle it opposes the attempt to entrain the threaded nut simply in the circumferential direction during this rotary movement, and thus ensures that the rotary movement of the threaded spindle is converted into an axial movement of the threaded nut.

Furthermore it should be added that the rotary drive, as is known per se, can comprise an electric motor and a reduction gear, wherein the reduction gear is connected at the output end to the first coupling element.

According to a third aspect the present invention relates to a modular system having at least two rotary drive assemblies, in each case with at least one rotary drive assembly feature according to any of the preceding claims, and at least two spindle drive assemblies, in each case with at least one spindle drive assembly feature according to any of the preceding claims.

It should also be added that the free end of the threaded spindle can be formed as the second coupling element or in other words can be formed integrally therewith.

The three embodiments discussed above are illustrated in the appended drawings:

BRIEF DESCRIPTION OF THE DRAWINGS

FIG. 1 shows a longitudinal section of the first embodiment,

FIG. 2 shows a longitudinal section of the second embodiment, and

FIG. 3 shows a longitudinal section of the third embodiment.

Figure 1:
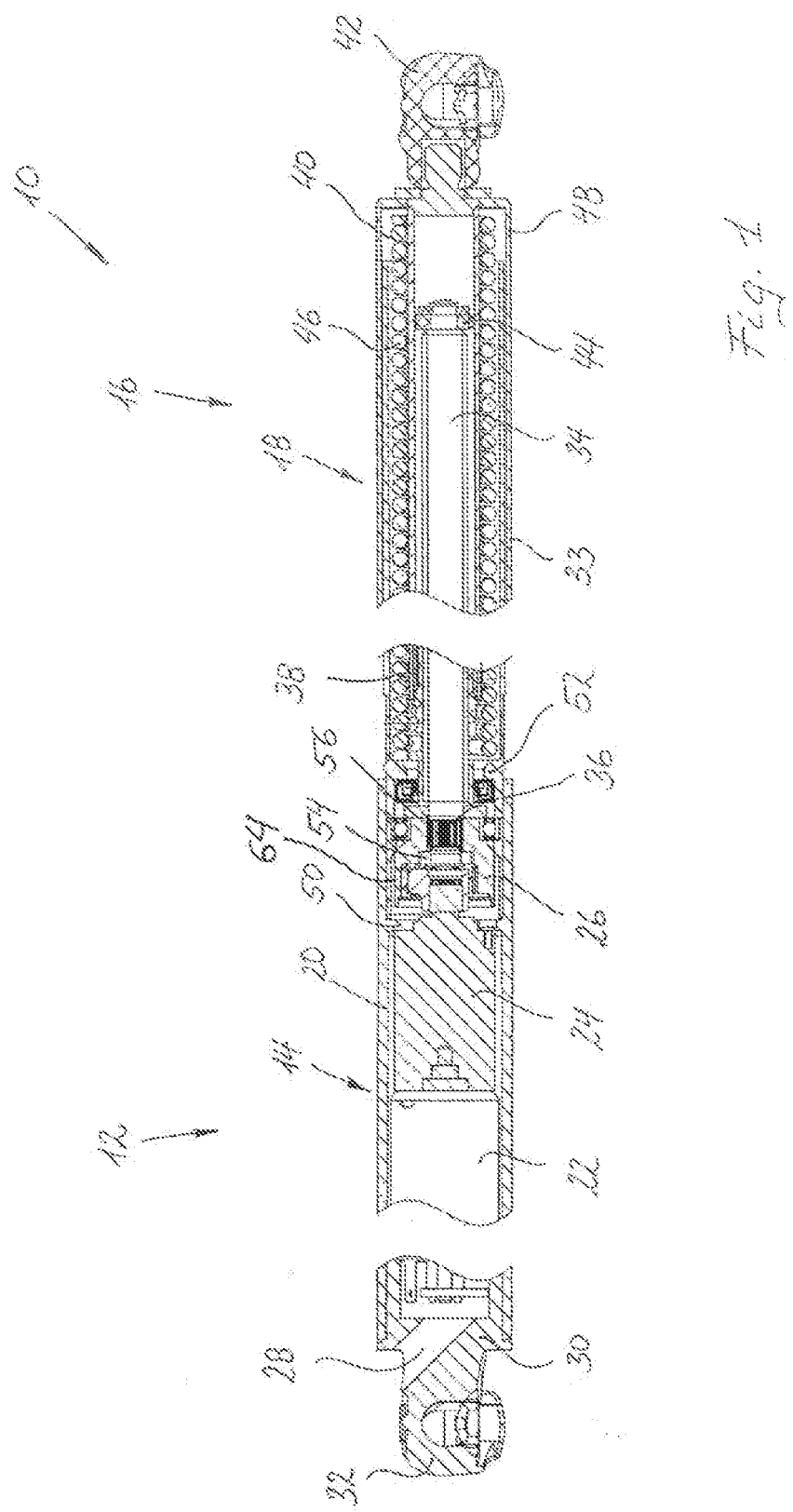
FIGS. 1-3

All three embodiments have substantially the same basic structure, and therefore this is to be described jointly at the outset for all embodiments before the differences between the three embodiments are described. Therefore the same reference numerals are used in all three figures for the same components.

All three embodiments of driving devices 10 according to the invention comprise a rotary drive assembly 12 having a rotary drive 14 and a spindle drive assembly 16 having a spindle drive 18.

The rotary drive 14 is received in a housing tube 20 and comprises an electric motor 22 which has a reduction gear 24 connected downstream. On the output side the reduction gear 24 is connected to a first coupling element 26. The electrical connecting lines (not shown) to the electric motor 22 can be introduced through an opening 28 into the housing tube 20.

Furthermore a base piece 30 which is provided with a socket 32 of a ball joint is provided on the free end of the housing tube 20.

The spindle drive 18 is received in a casing tube 33 and comprises a threaded spindle 34, of which the end facing the reduction gear 24 is connected to a second coupling element 36 which in the assembled state of the driving device 10 is in coupling engagement with the first coupling element 26. An external thread of the threaded spindle 34 is in threaded engagement with a threaded nut 38, so that a rotary movement transmitted by the electric motor 22 via the reduction gear 24 and the two coupling elements 26, 36 can be converted into an axial movement of the threaded nut 38.

The threaded nut 38 is connected to a guide tube 40, on the free end of which a further socket 42 of a ball joint is provided. A guide plate 44 which is in engagement with the inner face of the guide tube 40 is disposed on the end of the threaded spindle 34 facing away from the second coupling element 36. The guide tube 40 is surrounded by a helical compression spring 46, the function of which resides firstly in the exclusion of any mechanical hysteresis in the engagement between the threaded spindle 34 and the threaded nut 38 and secondly in the support of the electric motor 22 during an extension of the driving device 10. For protection of the helical compression spring 46 against external effects it is surrounded by a protective tube 48 which is also connected to the free end of the guide tube 40.

It should be added that in all three embodiments a radially inwardly protruding projection 50 is provided, wherein the rotary drive 14 is held in the housing tube 20 between the base piece 30 and the projection 50.

In all three embodiments the base piece 30, the housing tube 20 and the casing tube 33 are manufactured from plastics material and are connected to one another by cohesive bonding, either by forming them integrally with one another or connecting them at a later stage by cohesive bonding.

In the first embodiment according to FIG. 1 the projection 50 is formed integrally on the inner circumferential surface of the housing tube 20. Therefore the rotary drive 14 in FIG. 1 must be introduced from the left into the housing tube 20. This means that the base piece 30 is formed separately from the housing tube 20 and is connected thereto at a later stage by cohesive bonding during the assembly of the driving device 10. The rotary drive 14 is disposed on the side of the projection 50 facing the base piece 30, whilst the first coupling element 26 is disposed on the side of the projection 50 facing away from the base piece 30. Furthermore, in the first embodiment the housing tube 20 and the casing tube 33 are formed separately from one another and are connected to one another at a later stage by cohesive bonding during the assembly of the driving device 10. Also the casing tube 33 has a radially inner projection 52 on which the helical compression spring 46 is supported. The end of the threaded spindle 34 associated with the second coupling element 36 passes through the passage formed by the projection 52 and bears the second coupling element 36, so that in the assembled state of the driving device 10 the second coupling element 36 is disposed between the two projections 50 and 52.

With regard to the first embodiment it should be added that the opening 28 is formed in the base piece 30.

Figure 2:
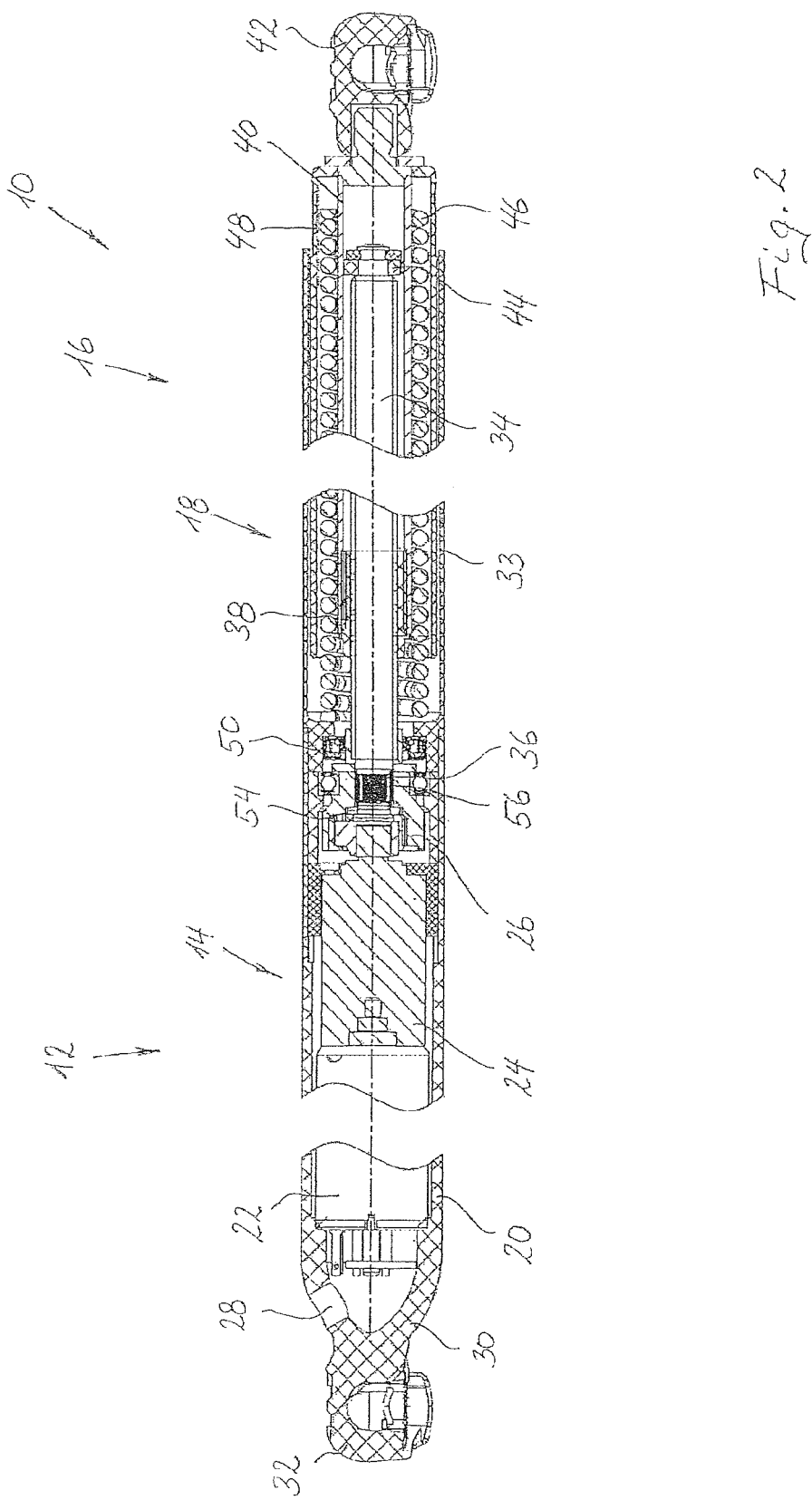

In the second embodiment according to FIG. 2 the base piece 30 is formed integrally with the housing tube 20. Therefore the rotary drive 14 in FIG. 1 must be introduced from the right into the housing tube 20. Furthermore, the housing tube 20 and the casing tube 33 are formed separately from one another and are connected to one another at a later stage by cohesive bonding during the assembly of the driving device 10. The projection 50 is formed on the end of the casing tube 33 facing the housing tube 20. The end of the threaded spindle 34 associated with the second coupling element 36 passes through the passage formed by the projection 50 and bears the second coupling element 36.

Figure 3:
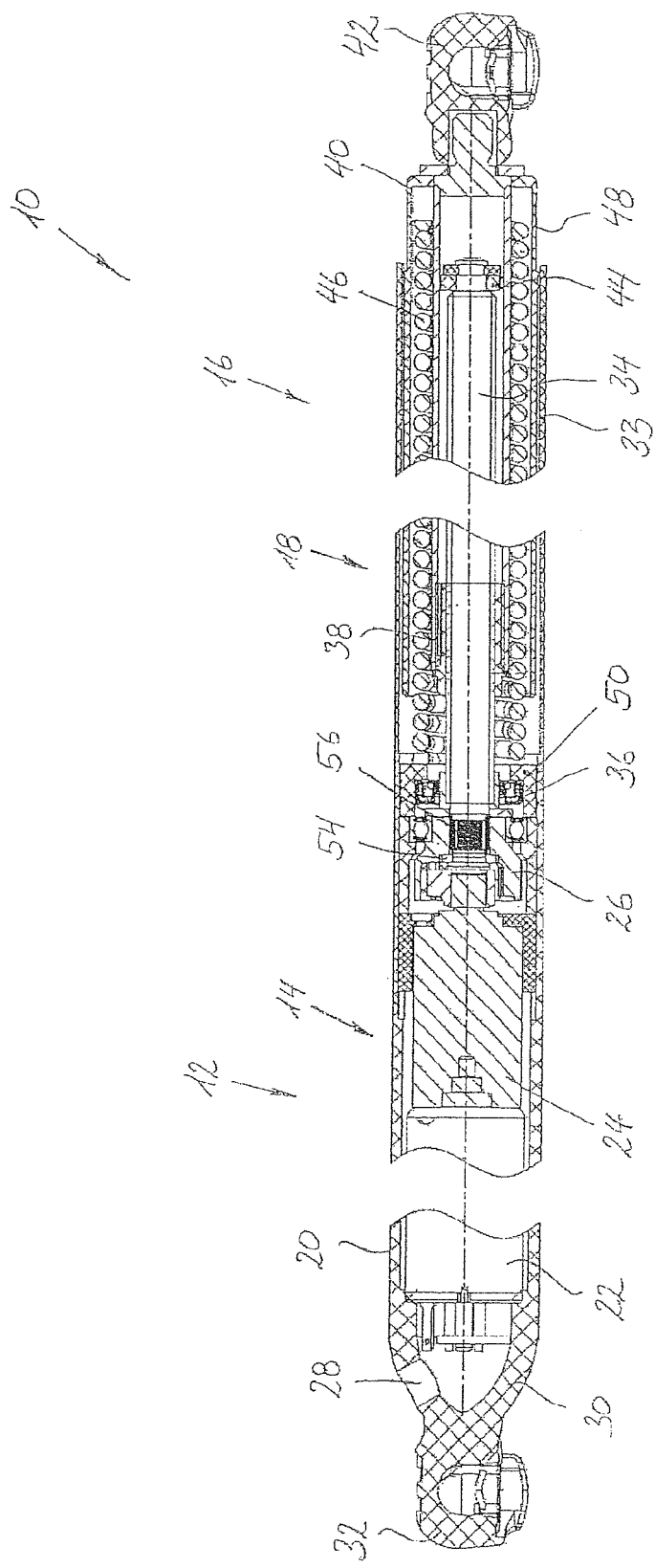

In the third embodiment according to FIG. 3 the housing tube 20 and the casing tube 33 are formed integrally with one another, and also the base piece 30 is formed integrally with the housing tube 20. Therefore both the rotary drive 14 and also the spindle drive 18 in FIG. 3 must be introduced from the right into the housing/casing tube 20/33. This also means that the projection 50 is formed separately from the housing/casing tube 20/33 and is introduced between the rotary drive 14 and the spindle drive 18 into the housing/casing tube 20/33 and is connected thereto at a suitable position.

As is indicated schematically in FIGS. 1 to 3, in all three embodiments the coupling engagement of the first coupling element 26 and of the second coupling element 36 can be formed in the axial direction by a snap connection 54 and in the circumferential direction by a connection 56 of the two coupling elements by positive engagement.

Otherwise the structure of the driving devices 10 in all three embodiments corresponds to that of known driving devices. As a representative example, reference is made here to the related description of DE 10 2008 008 743 A1.

It should also be added that the driving device can be provided advantageously with a first or/and a second seal, wherein the first seal can be disposed between the spindle drive and the housing tube or the casing tube in order to prevent extraneous substances, for example water or dust, from penetrating into the region of the rotary drive from the spindle drive side between the threaded spindle and the housing tube during operation. The second seal can be provided on the outside of the casing tube in the region in which the casing tube is connected to the housing tube, in order to prevent extraneous substances from penetrating between the casing tube and the protective tube, in particular in the completely inserted state of the driving device.

Furthermore, it should be added that between the rotary drive and the first coupling element a resilient damping can be provided, which has a certain play for improvement of the smooth running and for absorption of impact loading during starting, but which does not allow any slippage. In addition or as an alternative an overload coupling can be provided between the rotary drive and the first coupling element, and is formed in such a way that it decouples the rotary drive and the threaded spindle in the event of a torque to be transmitted which exceeds a predetermined value. By means of the overload coupling it can be ensured that the rotary drive assembly is not damaged even in a case in which there is a high torque of this type.

Finally it may be added that between the threaded spindle and the housing tube or the casing tube a rotary brake can be provided which is designed to exert a predetermined braking force against a rotation of the threaded spindle in at least one direction of rotation. In this way on the one hand a hysteresis can be produced in the spindle drive, and on the other hand a braking torque can also be produced during rotation of the threaded spindle. The increased start-up power produced in this way can be adjusted by suitable selection of the brake parts for example in such a way that the driving device remains in its extended position even in the currentless state up to a predetermined external force on one of its ends.

Furthermore FIGS. 4 to 9 are described below and show further embodiments according to the invention with the added features and functions:

BRIEF DESCRIPTION OF THE DRAWINGS

FIGS. 4-9

Figure 4:
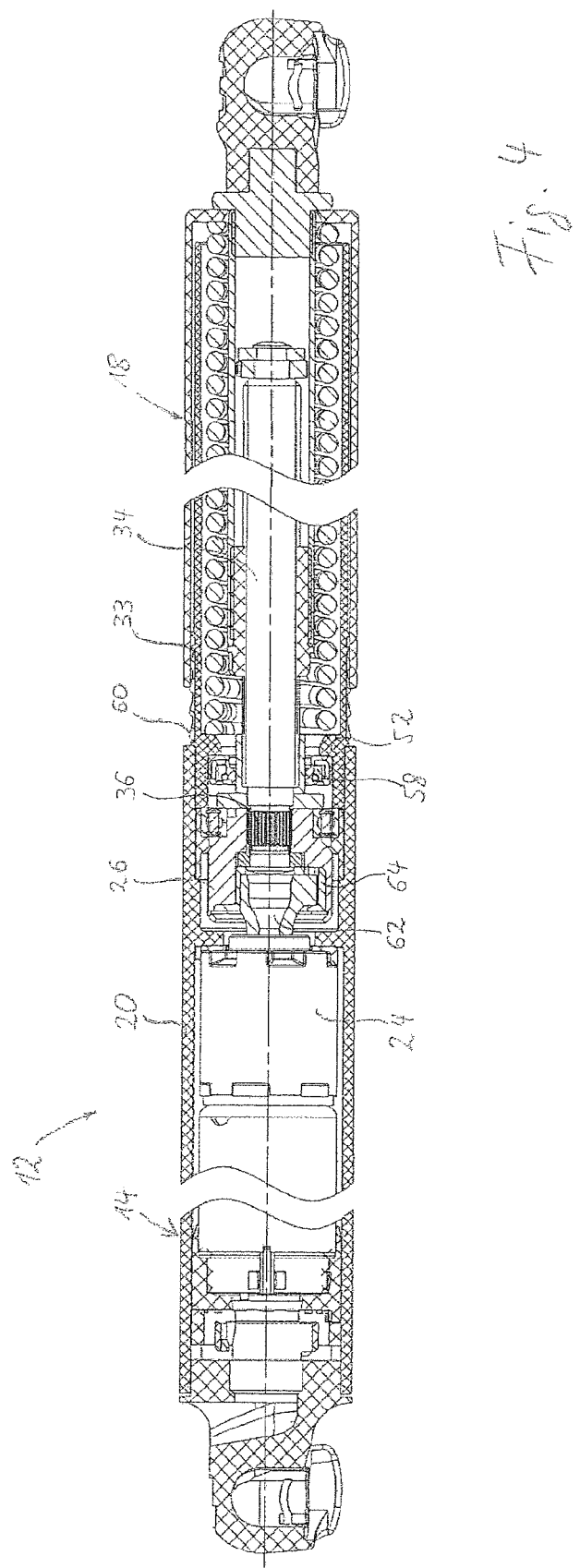
Figure 5:
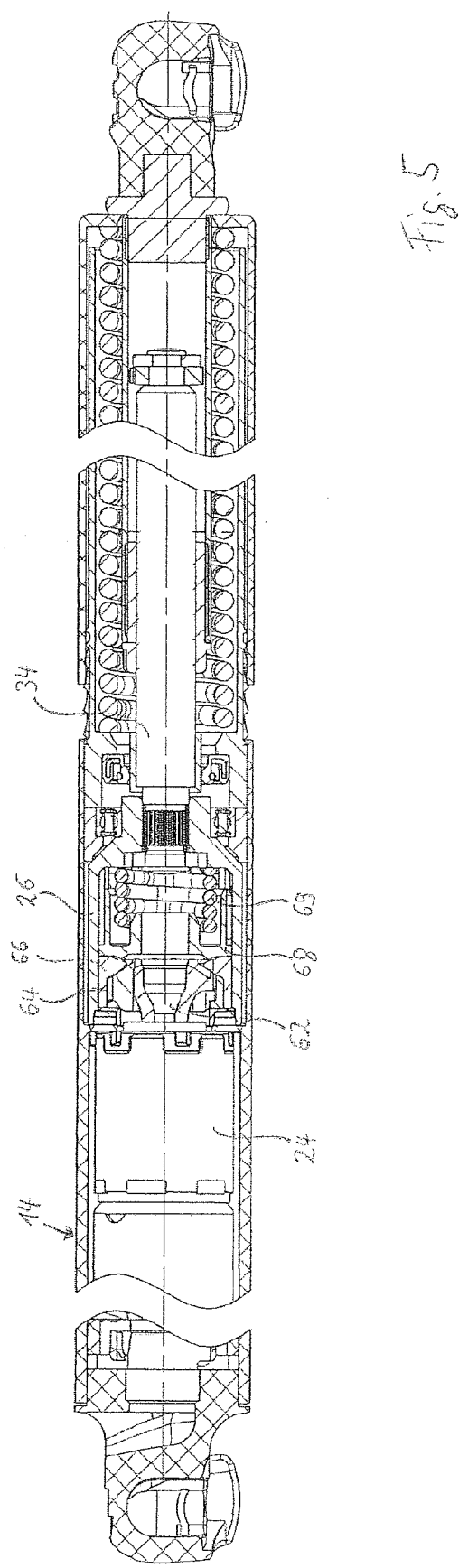
Figure 6:
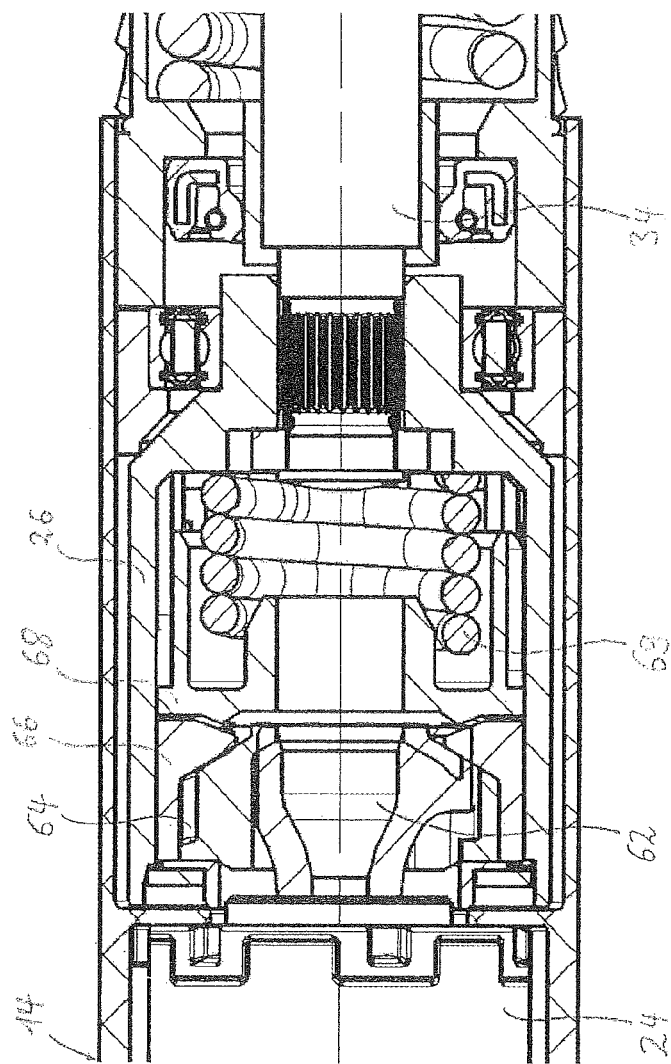
Figure 7:
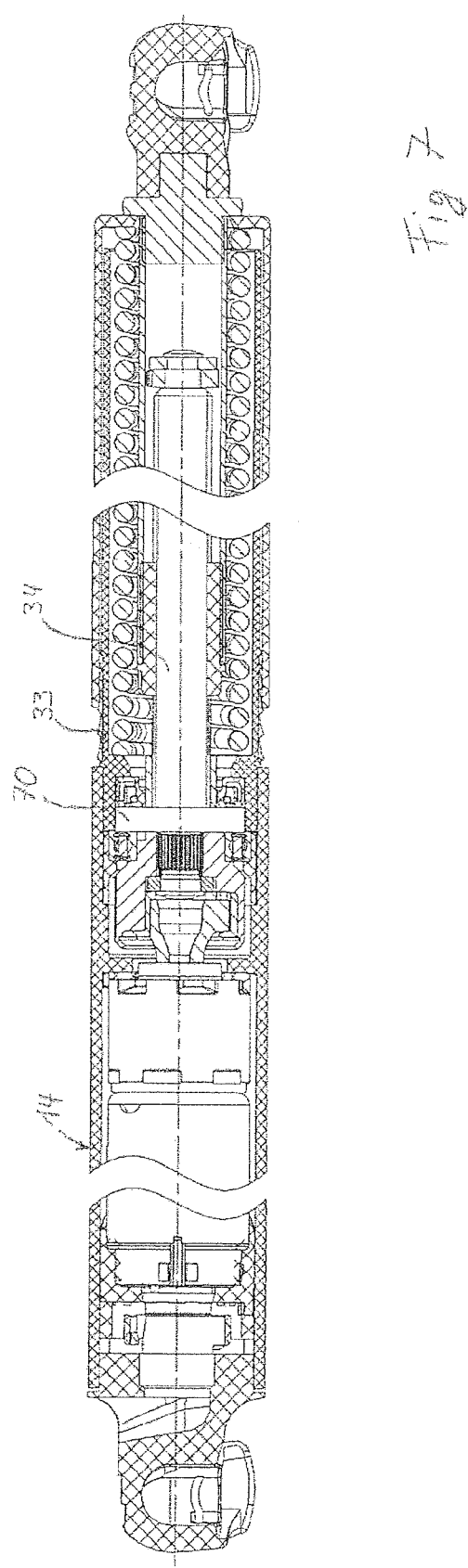
Figure 8:
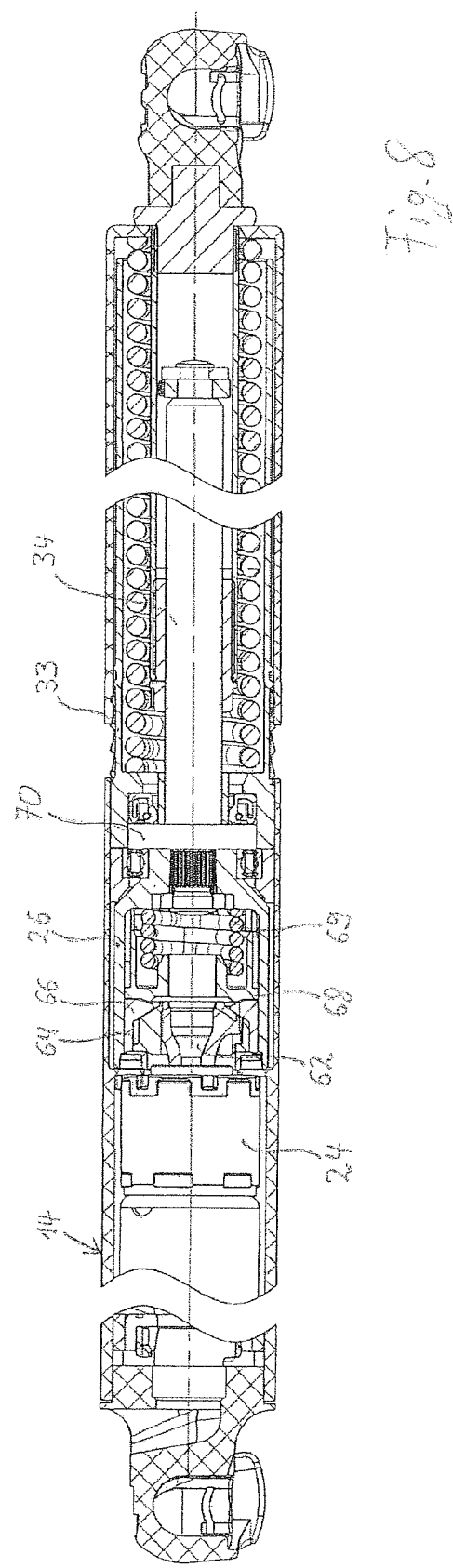

FIG. 4 shows a longitudinal section of a fourth embodiment,

FIG. 5 shows a longitudinal section of a fifth embodiment,

FIG. 6 shows an enlargement of the overload coupling from the fifth embodiment,

FIG. 7 shows a longitudinal section of a sixth embodiment,

FIG. 8 shows a longitudinal section of a seventh embodiment, and

Figure 9:
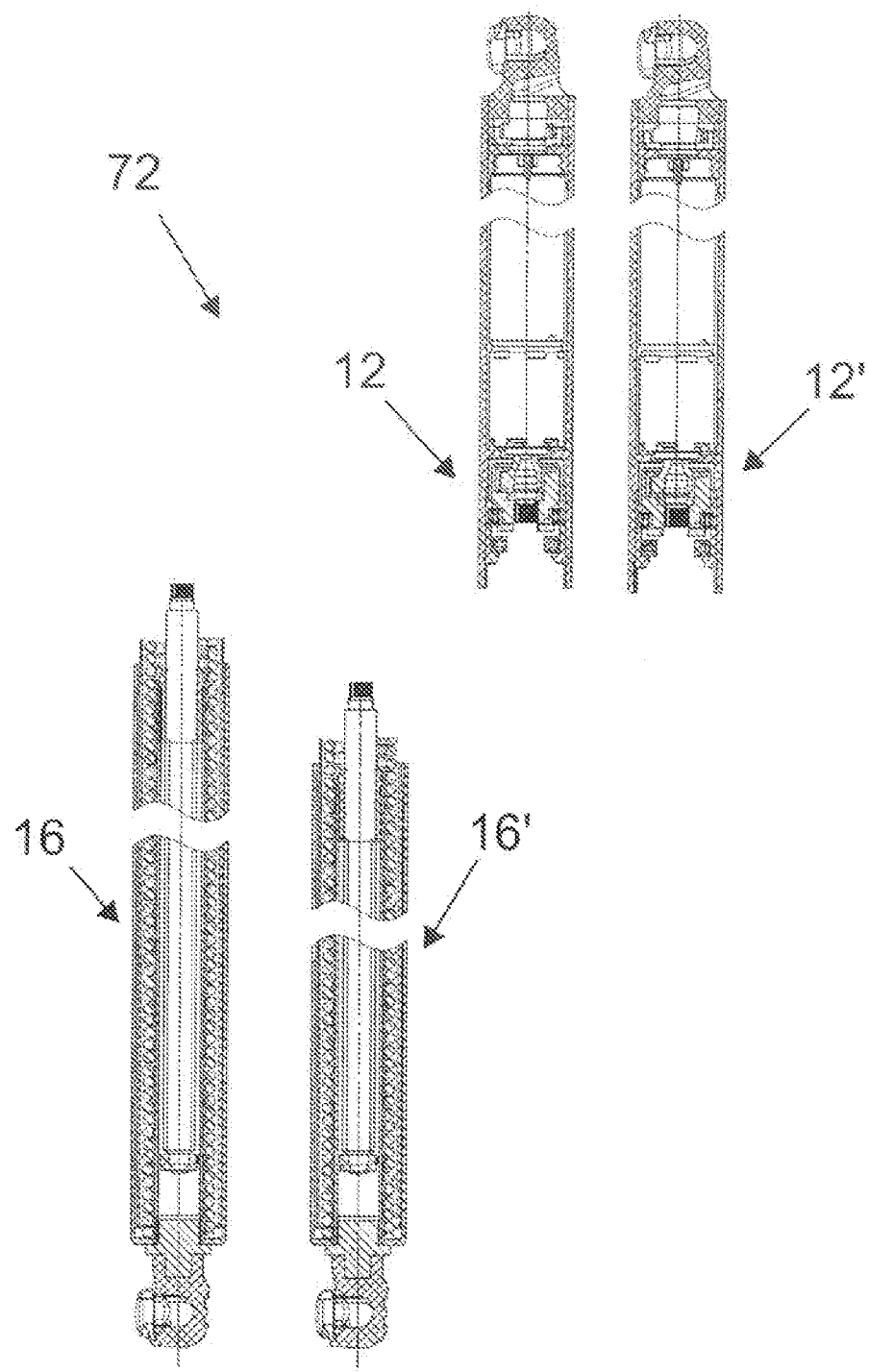

FIG. 9 shows a modular system which includes at least two rotary drive assemblies and at least two spindle drive assemblies.

The fourth embodiment according to FIG. 4 corresponds substantially to the first embodiment, but a seal 60 is provided.

Also a first seal 58 is shown which has already been illustrated in FIGS. 1 to 3. However it is not provided with a reference numeral there, and a description was previously omitted. Viewed radially from the central axis of the threaded spindle 34, the first seal 58 is located adjoining the threaded spindle 34 on the outside, and axially substantially in the region in which the threaded spindle 34 emerges from the housing tube 20. In particular, in FIG. 4 it directly adjoins the projection 52 on the side facing the rotary drive 14, and is configured as an annular seal around the threaded spindle 34. The first seal 58 is associated with the rotary drive assembly 12 so that during the assembly of the second coupling element 36 this second coupling element passes through the first seal 58.

The first seal 58 prevents extraneous substances, for example water or dust, from penetrating into the region of the rotary drive 14 from the spindle drive side between the threaded spindle 34 and the housing tube 20 during operation.

A second seal 60 is disposed on the outer face of the casing tube 33 on the side of the spindle drive 18 then on the region in which the casing tube 33 is connected to the housing tube 20. The seal 60 consists of a plurality of fins which can be formed on the casing tube 33 or can also be formed as a separate element firmly connected to the casing tube 33. In the inserted state of the spindle drive 18 the second seal 60 ensures that no extraneous substances can penetrate between the casing tube 33 and the protective tube 48.

A resilient damping between the output shaft of the reduction gear and the first coupling element is already shown in the embodiments of FIGS. 1 to 4, but a description thereof was previously omitted. This is now to be remedied with reference to the fifth embodiment in FIGS. 5 and 6. The resilient damping contributes to an improvement of the smooth running and to the absorption of impact loading during starting, as it has a certain play but does not allow any slippage.

The resilient damping is implemented in the first to fourth embodiments in that the connection between the output shaft 62 of the reduction gear 24 and the first coupling element 26 is produced by means of a resilient element 64.

The fifth embodiment according FIG. 5 corresponds substantially to the fourth embodiment, but additionally comprises an overload coupling, which is again shown on an enlarged scale in FIG. 6 for the sake of clarity, between the output shaft 62 of the reduction gear 24 and the first coupling element 26.

For this purpose the resilient element 64 is not directly connected to the first coupling element 26, but to a coupling ring 66 which is rotatable relative to the first coupling element 26. A slide 68 which is received so that it can slide axially but is non-rotatable relative to the first coupling element 26 is preloaded with a predetermined force in the direction of the coupling ring 66 by a spring 69 supported on the first coupling element 26. Thus a frictional grip or/and positive engagement occurs between the coupling ring 66 and the slide 68, by means of which the rotary movement of the output shaft 62 of the reduction gear 24 is transmitted to the first coupling element 26.

If an unusually high torque is applied to the first coupling element 26 or the output shaft 62 of the reduction gear 24, for example due to an external force, which acts on one side of the driving device 10, then there is a slippage between the coupling ring 66 and the slide 68. Thus in the event of an unusually high torque occurring the rotary drive assembly 14 is decoupled from the threaded spindle 34 by means of the overload coupling, and damage for example to the engine or transmission is thereby prevented.

In the sixth embodiment according to FIG. 7, by comparison with the fourth embodiment, in addition a rotary brake 70 is provided on the end portion of the threaded spindle 34 facing the rotary drive 14. The rotary brake 70 can be constructed in such a way that it acts either in one or in both possible directions of rotation of the threaded spindle 34.

For this purpose, after the assembly of the driving device an inner part of the brake 70 is connected by positive engagement to the threaded spindle 34 and rotates therewith, whilst an outer part is connected by positive engagement to the casing tube 33. The two parts of the brake 70 are in frictional contact, so that on the one hand a hysteresis is produced in the spindle drive, and on the other hand a braking torque is also produced during rotation of the threaded spindle 34. The increased start-up power produced in this way can be adjusted by suitable selection of the first and second brake parts for example in such a way that the driving device 10 remains in its extended position even in the currentless state up to a predetermined external force on one of its ends.

In the seventh embodiment shown in FIG. 8 both the overload coupling of the fifth embodiment and also the rotary brake of the sixth embodiment are provided.

FIG. 9 show a modular system 72 that includes at least two rotary drive assemblies 12, 12' and at least two spindle drive assemblies 16, 16'.

The invention claimed is:

1. A modular system of driving devices for a flap of a vehicle, each of the driving devices comprising:
    a rotary drive; and
    a spindle drive having a threaded spindle and a threaded nut disposed on the threaded spindle,
    wherein the rotary drive is connected to the threaded spindle or the threaded nut via a coupling unit having a first coupling element on a side of the rotary drive and a second coupling element on a side of the spindle drive,
    wherein the threaded spindle and the threaded nut are axially movable relative to one another in reaction to a rotation of the rotary drive,
    wherein each of the driving devices of the modular system comprises a rotary drive assembly and a spindle drive assembly, wherein each rotary drive assembly comprises the rotary drive and the first coupling element and each spindle drive assembly comprises the spindle drive and the second coupling element,
    wherein the modular system comprises the rotary drive assembly and at least one additional rotary drive assembly and the spindle drive assembly and at least one additional spindle drive assembly, wherein the first coupling element of each rotary drive assembly and a first coupling element of each additional rotary drive assembly of the modular system are identically constructed, but the rotary drive assembly and the at least one additional rotary drive assembly have different rotary drive powers, wherein the second coupling element of each spindle drive assembly and a second coupling element of each additional spindle drive assembly of the modular system are identically constructed, but the spindle drive assembly and the at least one additional spindle drive assembly have different stroke lengths, wherein the first coupling elements of the rotary drive assembly and the at least one additional rotary drive assembly and the second coupling elements of the spindle drive assembly and the at least one additional spindle drive assembly are compatible with one another, and wherein one of the rotary drive assembly and the at least one additional rotary drive assembly is put together with one of the spindle drive assembly and the at least one additional spindle drive assembly to form a specific type of driving device.

2. The modular system of driving devices according to claim 1, wherein the rotary drive is received in a housing tube which is closed at an end remote from the spindle drive by a base piece, and wherein the base piece and the housing tube are plastics material, and the base piece is connected by cohesive bonding to the housing tube.

3. The modular system of driving devices according to claim 2, wherein the housing tube and the base piece are formed separately from one another and are cohesively bonded to one another at a later stage.

4. The modular system of driving devices according to claim 2, wherein the spindle drive is surrounded by a casing tube.

5. The modular system of driving devices according to claim 4, wherein the casing tube and the housing tube are formed separately from one another and are cohesively bonded to one another at a later stage by welding.

6. The modular system of driving devices according to claim 2, wherein a radially inwardly protruding projection is provided, wherein the rotary drive is held in the housing tube between the base piece and the projection.

7. The modular system of driving devices according to claim 6 wherein the housing tube and the base piece are formed separately from one another and are cohesively bonded to one another at a later stage and the projection is formed integrally with the housing tube.

8. The modular system of driving devices according to claim 1, wherein a resilient damping is provided between the rotary drive and the first coupling element.

* * * * *